United States Patent Office 2,952,689
Patented Sept. 13, 1960

2,952,689
COUMARIN DERIVATIVES AND THEIR PRODUCTION

Edgar Enders and Adam Müller, Leverkusen-Bayerwerk, Germany, assignors to Farbenfabriken Bayer Aktiengesellschaft, Leverkusen, Germany, a corporation of Germany No Drawing. Filed Apr. 17, 1957, Ser. No. 653,276

Claims priority, application Germany Apr. 25, 1956

5 Claims. (Cl. 260—343.2)

This invention relates to a new process for obtaining derivatives of 4-hydroxy-coumarin of the general formula

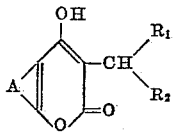

in which A stands for the radical forming a coumarin ring, $R_1$ stands for alkyl and $R_2$ stands for aryl or

may furthermore be combined, thus yielding a hydroaromatic or heterocyclic radical.

Compounds of the above shown formula are very effective blood anti-coagulators. Furthermore some compounds which may be considered as somewhat related to the above shown substances have become known as rodenticides during the last years. Especially such compounds which in their alkyl group contain still a ketone group are known under various trade marks as being commercial rodenticides.

A principal object of the present invention is to find a new and effective process for obtaining compounds of the formula shown above. Another object is to find within the group of these compounds certain new and useful rodenticides. Still another object is to find new and useful rodenticidal mixtures containing compounds of the above shown formula as active ingredients. Still further objects will become apparent as the following description proceeds.

In accordance with the present invention it has now been found that 3-(alkyl-aryl-methyl)-substituted 4-hydroxy-coumarins of the above formula can be obtained by condensing 4-hydroxy-coumarin or its derivatives substituted in the benzene nucleus with alkyl-aryl-carbinols or substituted aryl products thereof. From the following equation the reaction of 4-hydroxy-coumarin itself with phenyl-methyl-carbinol is to be seen. This equation, however, is to be understood as an example for the general reaction between all substituted 4-hydroxy-coumarins and possibly further aryl-substituted derivatives or homologues of methyl-phenyl-carbinol:

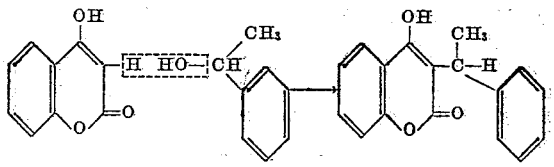

In addition to 4-hydroxy-coumarin itself there may be used, for example, 6- or 7-chloro-4-hydroxy-coumarin, 6- or 7-methyl-4-hydroxy-coumarin, and 6- or 7-methoxy-4-hydroxy-coumarin. Other aryl-alkyl-carbinols which may also successfully be used are for instance ethyl-phenyl-carbinol, n-propyl-phenyl-carbinol, isopropyl-phenyl-carbinol, butyl-phenyl-carbinol, methyl-parachloro-phenyl-carbinol, ethyl-paramethoxy-phenyl-carbinol, n-propyl-paratolyl-carbinol, α-tetralol, α-indanol, γ-chromanol, and the like. Instead of these carbinols also some derivatives thereof may effectively be used for the inventive reaction. Such derivatives include lower alkyl ethers and esters either of organic or inorganic origin. Thus, the carbinol-methyl- or -ethyl-ethers, the carbinol-acetates, -propionates or the halides, such as chlorides or bromides of these carbinols may be used successfully, too.

The condensation may be carried out by heating the reactants in a solvent with or without the addition of condensing agents capable of splitting off water such as sulphuric acid, zinc chloride, phosphoric acid, aluminium chloride and phosphorus pentoxide, or by heating the components in the melt with or without the addition of condensing agents. Generally the reaction may be carried out at temperatures from 50 to 250° C., especially temperatures from 100° to 150° C. are the best. The reaction also may be carried out by reacting the compounds in concentrated sulphuric acid if necessary at elevated or slightly elevated temperatures. As solvents there may be used organic solvents, preferably with higher boiling points, such as aliphatic hydrocarbons or aliphatic carboxylic acids, e.g. formic acid, acetic acid, propionic acid etc. Higher boiling aromatic hydrocarbons or halogenated aromatic hydrocarbons such as chlorobenzene, tetrahydro-naphthalene and the like may also be used. Purification of the reaction products is often unnecessary so that they may be worked up as obtained, for instance as a melt or after removal of the solvents by evaporation or pouring into water followed by filtration.

For purification, it is expedient to produce the alkali metal salts in an aqueous solution and precipitate them after filtration by addition of acid. Further purification may be effected by recrystallisation from an organic solvent.

As described at the beginning of this application the compounds of the present invention are very useful and effective rodenticides. Compounds which correspond to the general formula

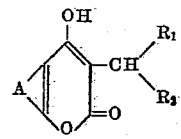

and which have proven to be effective rodenticides are for example 3-(α-phenyl-ethyl)-4-hydroxy-coumarin,
3-(α-phenyl-n-propyl)-4-hydroxy-coumarin,
3-(α-phenyl-n-butyl)-4-hydroxy-coumarin,
3-(α-phenyl-isobutyl)-4-hydroxy-coumarin,
3-(α-phenyl-n-pentyl)-4-hydroxy-coumarin,
3-(α-phenyl-isoamyl)-4-hydroxy-coumarin,
3-(phenyl-cyclohexyl-methyl)-4-hydroxy-coumarin,
3-[α-(p-chlorophenyl)-ethyl]-4-hydroxy-coumarin,
3-[α-(p-chlorophenyl)-propyl]-4-hydroxy-coumarin,
3-[α-(p-chlorophenyl)-n-butyl]-4-hydroxy-coumarin,
3-[α-(p-fluorphenyl)-ethyl]-4-hydroxy-coumarin,
3-[α-(p-fluorphenyl)-propyl]-4-hydroxy-coumarin,
3-[α-(p-fluorphenyl)-n-butyl]-4-hydroxy-coumarin,
3-[α-(p-bromo-phenyl)-ethyl]-4-hydroxy-coumarin,
3-[α-(p-bromo-phenyl)-propyl]-4-hydroxy-coumarin,
3-[α-(p-methoxy-phenyl)-ethyl]-4-hydroxy-coumarin,
3-[α-(p-methoxyphenyl)-propyl]-4-hydroxy-coumarin,
3-[α-(methoxy-phenyl)-n-butyl]-4-hydroxy-coumarin,
3-[α-(ethoxyphenyl)-ethyl]-4-hydroxy-coumarin, 3-[α-(phenoxy-phenyl)-ethyl]-4-hydroxy-coumarin,
3-[α-(diphenyl)-ethyl]-4-hydroxy-coumarin,
3-[α-(diphenyl)-propyl]-4-hydroxy-coumarin,
3-[α-(p-methylphenyl)-ethyl]-4-hydroxy-coumarin,
3-[α-(p-methylphenyl)-propyl]-4-hydroxy-coumarin,
3-[α-(p-methylphenyl)-n-butyl]-4-hydroxy-coumarin,
3-[α-(p-ethylphenyl)-ethyl]-4-hydroxy-coumarin,
3-[α-(p-ethylphenyl)-propyl]-4-hydroxy-coumarin,
3-[α-(p-isopropyl-phenyl)-ethyl]-4-hydroxy-coumarin,
3-[α-(p-isopropyl-phenyl)-propyl]-4-hydroxy-coumarin,
3-[α-(p-cyclohexyl-phenyl) - ethyl]-4-hydroxy-coumarin,
3-[α-(2',5'-dimethyl-phenyl) - ethyl] - 4 - hydroxy-coumarin,
3-[α-(2',5'-dimethyl-phenyl) - propyl] - 4 - hydroxy-coumarin,
3-[α-2',4'-dimethyl-phenyl) - ethyl] - 4 - hydroxy-coumarin,
3-[α-(2',4'-dimethyl - phenyl)-propyl] - 4-hydroxy-coumarin,
3-[α-(3',4'-dimethyl-phenyl) - ethyl] - 4 - hydroxy-coumarin,
3-[α-(3',4'-dimethyl-phenyl) - propyl] - 4 - hydroxy-coumarin,
3-[α-(3',4'-tetramethylene-phenyl)-ethyl] - 4 - hydroxy-coumarin,
3-[α-3',4'-tetramethylene-phenyl)-propyl] - 4 - hydroxy-coumarin,
3-[α-(3',4' - trimethylene-phenyl)-ethyl] - 4 - hydroxy-coumarin,
3-[α-(3',4'-trimethylene-phenyl)-propyl] - 4 - hydroxy-coumarin,
3-[α-(3',4'-methylenedioxy-phenyl)-ethyl] - 4 - hydroxy-coumarin,
3-[α-(3',4'-methylenedioxy-phenyl)-propyl] - 4 - hydroxy-coumarin,
3-[α-(1'-naphthyl)-ethyl]-4-hydroxy-coumarin,
3-[α-(1'-naphthyl)-propyl]-4-hydroxy-coumarin,
3-[α-(2'-naphthyl)-ethyl]-4-hydroxy-coumarin,
3-[α-(2'-furyl)-ethyl]-4-hydroxy-coumarin,
3-[α-(2'-furyl)-propyl]-4-hydroxy-coumarin,
3-[α-(2'-thienyl)-ethyl]-4-hydroxy-coumarin,
3-[α-(3'-acetamido-phenyl)-ethyl]-4-hydroxy-coumarin,
3-[α-(3'-acetamido-phenyl)-propyl] - 4 - hydroxy-coumarin,
3-[α-(p-nitrophenyl)-ethyl]-4-hydroxy-coumarin,
3-[α-(p-nitrophenyl)-propyl]-4-hydroxy-coumarin,
3-[α-(p-carboxyphenyl)-ethyl] - 4 - hydroxy-coumarin,
3-[α-(3'-acetnaphthyl)-ethyl]-4-hydroxy-coumarin,
3-[α-(3'-dibenzofuryl)-ethyl]-4-hydroxy-coumarin,
3-(α,β-diphenyl-ethyl)-4-hydroxy-coumarin,
3-(α,γ-diphenyl-propyl)-4-hydroxy-coumarin,
3-(al.α-tetralyl)-4-hydroxy-coumarin,
3-(al.α-indanyl)-4-hydroxy-coumarin,
3-(4'-chromanyl)-4-hydroxy-coumarin.

A further group of compounds which corresponds to the above shown formula is based on coumarin derivatives bearing substituents in the coumarin nucleus, thus being derived from 6- or 7-methyl-4-hydroxy-coumarin, 6- or 7-chloro-4-hydroxy-coumarin and 6- or 7-methoxy-4-hydroxy-coumarin, 7-nitro-4 - hydroxy-coumarin, 7,8-benzo-4-hydroxy-coumarin and the 5,6-benzo-4-hydroxy-coumarin. Examples for such inventive derivatives are 6-chloro-3-(α-phenyl-ethyl)-4-hydroxy-coumarin,
7-chloro-3-(α-phenyl-ethyl)-4-hydroxy-coumarin,
6-methyl-3-(α-phenyl-propyl)-4-hydroxy-coumarin,
7-methyl-3-(α-phenyl-propyl)-4-hydroxy-coumarin,
6-methoxy-3-(α-phenyl-propyl)-4-hydroxy-coumarin,
7-methoxy-3-(α-phenyl-propyl)-4-hydroxy-coumarin,
7 - chloro - 3 - [α - (p - methylphenyl) - propyl] - 4 - hydroxy-coumarin,
7 - methyl - 3 - [α - (p - methylphenyl) - propyl] - 4 - hydroxy-coumarin,
7-methyl-3-(α-phenylethyl)-4-hydroxy-coumarin,
7 - methyl - 3 -[α - (p - ethylphenyl) - propyl] - 4 - hydroxy-coumarin,
7 - methyl - 3 - [α - (p - anisyl) - n - propyl] - 4 - hydroxy-coumarin,
7 - chloro - 3 - (al.α-tetrahydronaphthyl) - 4 - hydroxy-coumarin,
7 - methyl - 3 - (al.α - tetrahydronaphthyl) - 4 - hydroxy-coumarin,
6 - methyl - 3 - (al.α - tetrahydronaphthyl) - 4 - hydroxy-coumarin,
7 - methoxy - 3 - (al.α - tetrahydronaphthyl) - 4 - hydroxy-coumarin,
7-methyl-3-(α-indanyl)-4-hydroxy-coumarin,
7-methyl-3-(4'-chromanyl)-4-hydroxy-coumarin,
7 - methyl - 3 - [α - (3',4' - tetramethylene - phenyl)-propyl]-4-hydroxy-coumarin.

The active ingredients preferably are used together with suitable inert diluents or carriers, especially of solid nature. Preferred carriers are compounds such as talc, chalk, bentonite, caolin, kieselguhr and the like. The active ingredients are intimately mixed with these inert carriers and then may be strewn on places where rodents are living. Thereby the animals are coming in close contact with the effective compounds and when cleaning themselves the poisonous material is eaten thus killing them. It is also possible to incorporate the extended compositions in suitable baits such as Quaker Oats, bread, fish, meat, flour and the like. A special preference of the inventive compounds consists in the fact that the compounds of this invention are taste- and odourless, thus giving the rodents no warning before eating them. A special advantage furthermore is the fact that the inventive compositions may contain only a very small amount of active ingredients such as about 0.01 to 1% of an active substance, thus not leading to any damage of bigger animals such as hens, cats, dogs and the like.

The inventive compounds sometimes may also be used in aqueous solutions especially when used as salts of alkali metals or of organic amines such as the sodium salt, triethyl-amine salt, cyclohexyl-amin salt, dicyclohexyl-amin salt and the like. An application in this way may especially be advantageous, when drinking places are to be cleared of rodenticides.

As a special example for the utility of the inventive compounds 3-(α-paramethyl-phenyl-propyl) - 4 - hydroxy-coumarin (0.75 gram), stearic acid (1 gram), and talc (98.25 grams) are intimately mixed and milled. This powder when strewn on places where rats and mice are living leads to an effective killing of them. Also when 25 mg. of this compound, 5 grams wheat flour and 49.975 grams Quaker oats are intimately mixed, this bait effectively kills rats and mice.

The following examples may illustrate the present invention:

Example 1

8 parts by weight of 4-hydroxy-coumarin and 9 parts by weight methyl-phenyl-carbinol are dissolved in 30 parts by volume acetic acid at a temperature of about 100° C. There are added 3 parts by volume concentrated sulphuric acid and the reaction mixture then is heated to reflux for 2 further hours. The reaction mixture is poured into water and the precipitate filtered with suction. The precipitate is taken up in ether, and the etherical solution is extracted with a sodium hydroxide solution. The aqueous extract is acidified with hydrochloric acid and the precipitated reaction product isolated by filtration with suction and then washed and dried. After recrystallising from benzene the 3-(α-phenyl-ethyl)-4-hydroxy-coumarin melts at 208 to 209° C.

Example 2

8 parts by weight of 6-chloro-4-hydroxy-coumarine and 9 parts by weight methyl-phenyl-carbinol are dissolved in 50 parts by volume acetic acid at a temperature of about 100° C. There are added 3 parts by volume concentrated sulphuric acid and the reaction mixture then is heated to reflux for further 2 hours. The working up is the same as described in Example 1. After recrystallising from 80% acetic acid the 6-chloro-3-(α-phenyl-ethyl)-4-hydroxy-coumarin melts at 208 to 211° C.

*Example 3*

100 parts by weight of 4-hydroxy-coumarin are dissolved in 100 parts by volume glacial acetic acid and 30 parts by volume sulphuric acid (60° Bé.). At a temperature of about 100° C. there are added 100 parts by weight phenyl-ethyl-carbinol. The reaction mixture is stirred for a further hour at a temperature of 100 to 110° C., and then it is poured into water. The reaction product is taken up with toluol. The toluol layer is completely extracted with diluted soda lye, the aqueous layer is filtered off by adition of charcoal and acidified with diluted hydrochloric acid in the cold. The precipitated reaction product is isolated by filtration, washed with water and then dried. Yield: 125 parts by weight of 3-(α-phenyl-propyl)-4-hydroxy-coumarin (M.P. 178 to 179° C. from diluted alcohol).

*Example 4*

8 parts by weight 4-hydroxy-coumarin and 11 parts by weight al.α-tetralol are dissolved in 5 parts by volume glacial acetic acid at a temperature of about 100° C. Then 1 part by volume sulphuric acid is slowly added (60° Bé.) so that a clear solution is formed. The reaction mixture is heated for another hour at a temperature of 110 to 120° C., then it is poured into water, and the reaction product is taken up in ether. The etherical layer is extracted with diluted soda lye, the extract is filtered over carbon black and acidified with diluted acidic acid. The precipitated reaction product is filtered off and dried, yield: 10 parts by weight of 3-(α-tetrahydronaphthyl)-4-hydroxy-coumarin (M.P. 186 to 187° C. recrystallised from alcohol).

The compound has the following formula

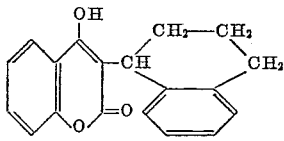

In analogous manner there are obtained from 7-chloro-4-hydroxy-coumarin the 7-chloro-3-(α-tetrahydronapthyl)-4-hydroxy-coumarin, M.P. 190 to 191° C., from 7-methyl-4-hydroxy-coumarin the 7-methyl-3-(al.α-tetrahydronaphthyl)-4-hydroxy-coumarin, M.P. 186 to 187° C., from 6-methyl-4-hydroxy-coumarin the 6-methyl-3-(al.α-tetrahydronaphthyl)-4-hydroxy-coumarin, M.P. 207 to 208.5° C., and from 7-methoxy-4-hydroxy-coumarin the 7-methoxy-3-(al.α-tetrahydronaphthyl)-4-hydroxy-coumarin, M.P. 190 to 192° C.

*Example 5*

8 parts by weight 4-hydroxy-coumarin and 9 parts by weight α-indanol are dissolved in 5 parts by volume glacial acetic acid at a temperature of 70 to 80° C. There are added slowly 0.5 part by volume sulphuric acid (60° Bé.). The mixture is stirred for another hour and kept at a temperature of 110 to 120° C. and then it is worked up as described in the foregoing example. There is obtained from diluted alcohol the 3-(α-indanyl)-4-hydroxy-coumarin, M.P. 196 to 198° C. The compound corresponds to the following formula

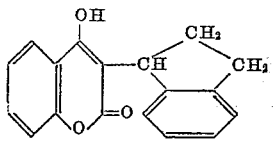

*Example 6*

8 parts by weight of 4-hydroxy-coumarine are dissolved in 20 parts by volume glacial acetic acid and 1 part by volume sulphuric acid (60° Bé.) at a temperature of about 100° C. There are added 9 parts by weight γ-chromanol. The reaction is completed in about 30 minutes at a temperature of 100 to 110° C. and the reaction mixture then is poured into water and taken up with ether. The etherical layer is extracted with diluted soda lye, the aqueous extract is acidified and the precipitated reaction product is filtered off and dried; M.P. 210 to 212° C. (from diluted alcohol); yield: 70% of the theoretical.

*Example 7*

8 parts by weight 4-hydroxy-coumarin and 8 parts by weight α-methoxy-ethyl-benzene are dissolved in 10 parts by volume glacial acetic acid, treated with 1 part by volume sulphuric acid (60° Bé.), and kept for 1 hour at a temperature of 110 to 120° C. After pouring the mixture into water the reaction product is taken up with ether and then extracted with diluted soda lye. The aqueous extract is acidified and the reaction product recrystallised from diluted alcohol. The 3-(α-phenyl-ethyl)-4-hydroxy-coumarin obtained melts at a temperature of 208 to 209° C.; yield: 60 to 70% of the theoretical. Instead of sulphuric acid there can be used as a condensing agent also zinc chloride, phosphorus acid or toluene sulphonic acid. The condensation may also be effected by heating the components in the melt at a temperature of about 150° C. Instead of α-methoxy-ethyl-benzene there can be also used α-acetoxy-ethyl benzene or α-bromo-ethyl benzene.

In analogous manner there are obtained the following compounds: from 4-hydroxy-coumarin and α-methoxy-n-propyl benzene, α-acetoxy-n-propyl benzene or α-bromo-n-propyl benzene the 3-(α-phenyl-n-propyl)-4-hydroxy-coumarin (M.P. 178 to 179° C.); from 4-hydroxy-coumarin and α-methoxy-n-propyl-4-methyl benzene or α-acetoxy-n-propyl-4-methyl benzene the 3-(α-p-tolyl-n-propyl)-4-hydroxy-coumarin (M.P. 131 to 132° C.); from 4-hydroxy-coumarin and α-methoxy-n-propyl-4-chloro benzene or α-acetoxy-n-propyl-4-chloro benzene the 3-(α-p-chloro-phenyl-n-propyl)-4-hydroxy-coumarin (M.P. 192 to 192.5° C.); from 7-methyl-4-hydroxy-coumarin and α-methoxy-n-propyl benzene or α-acetoxy-n-propyl-benzene the 7-methyl-3-(α-phenyl-n-propyl)-4-hydroxy-coumarin (M.P. 160 to 162° C.); from 4-hydroxy-coumarin and α-methoxy- or α-acetoxy-n-butyl benzene the 3-(α-phenyl-n-butyl)-4-hydroxy-coumarin (M.P. 200 to 201° C.); from 4-hydroxy-coumarin and α-acetoxy-ethyl-4-isopropyl-benzene the 3-[α-(4-isopropyl-phenyl)-ethyl]-4-hydroxy-coumarin (M.P. 158 to 160° C.); from 4-hydroxy-coumarin and α-methoxy-n-propyl-4-ethyl benzene the 3-[α-(4-ethyl-phenyl)-n-propyl]-4-hydroxy-coumarin (M.P. 158 to 160° C.).

*Example 8*

8 parts by weight 4-hydroxy-coumarin and 10 parts by weight α-hydroxy-hydroindene-methyl-ether are dissolved in 5 parts by volume glacial acetic acid with 1 part by volume sulphuric acid (60° Bé.) at a temperature of about 100° C., after standing for one hour at that temperature the melt is poured into water, the reaction product is taken up with ether and then extracted with diluted soda lye. The aqueous solution is acidified, the precipitated reaction product is filtered off and recrystallised from diluted alcohol. The 3-α-indanyl-4-hydroxy-coumarin obtained melts at a temperature of about 195° C. Instead of α-hydroxy-hydroindene-methyl-ether the α-acetoxy-hydroindene or the α-chloro-hydroindene can be used too. Analogous there is obtained the 3-al.-α-tetralyl-4-hydroxy-coumarin with al.-α-methoxy-tetrahydronaphthalene (M.P. 186 to 187° C.); yield: 40% of the theoretical.

Working up in the same manner as described above there are obtained the following compounds: from 7- methyl-4-hydroxy-coumarin and al.-α-acetoxy-tetra-hydronaphthalene the 7-methyl-3-(al.-α-tetralyl)-4-hydroxy-coumarin (M.P. 186 to 187° C.); from 7-methoxy-4-hydroxy-coumarin and al.-α-methoxy-tetrahydronaphthalene the 7-methoxy-3-(al.-α-tetralyl) - 4 - hydroxy - coumarin (M.P. 190 to 192° C.).

*Example 9*

250 parts by weight 4-hydroxy-coumarin are suspended in 200 parts by volume glacial acetic acid and 30 parts by volume sulphuric acid (60° Bé.) and stirred at a temperature of about 110° C. Afterwards 275 parts by weight p-tolyl-ethyl-carbinol are added within 30 minutes and then the mixture is stirred for another 30 minutes at the same temperature. The mixture is poured into water, the semi-solid reaction product is dissolved in toluol and the solution is extracted with 4% soda lye. The aqueous extract is filtered over charcoal and acidified. After filtration and drying there are obtained 340 parts by weight 3-[α-(p-tolyl)-propyl]-4-hydroxy-coumarin (M.P. 131 to 132° C. from diluted alcohol).

In analogous manner using 4-hydroxy-coumarin as starting material there are obtained the following compounds: with phenyl-n-propyl-carbinol the 3-[α-phenyl-n-butyl]-4-hydroxy-coumarin (M.P. 200 to 201°); with p-tolyl-n-propyl-carbinol the 3-[α-(p-tolyl)-n-butyl]-4-hydroxy-coumarin (M.P. 137 to 138°); with p-anisyl-n-propyl-carbinol the 3-[α - (p - anisyl) - n - butyl]-4-hydroxy-coumarin; with p-tolyl-n-butyl-carbinol the 3-[α-(p-tolyl)-n-pentyl]-4-hydroxy-coumarin (M.P. 160 to 162°); with p-isopropyl - phenyl-methyl-carbinol the 3-[α-(p-isopropyl-phenyl)-ether]-4-hydroxy-coumarin (M.P. 158 to 160°); with p-isopropyl-phenyl-ethyl-carbinol the 3-[α-(p-isopropyl-phenyl)-n-propyl]-4-hydroxy-coumarin (M.P. 144 to 146°); with p-ethyl-phenyl-methyl-carbinol the 3-[α-(p-ethyl-phenyl)-ethyl]-4-hydroxy-coumarin (M.P. 133 to 135°); with p-ethyl-phenyl-ethyl-carbinol the 3-[α-ethyl-phenyl)-n-propyl] - 4 - hydroxy-coumarin (M.P. 158 to 160°) with 3,4-dimethyl-phenyl-methyl-carbinol the 3-[α-(3',4'-dimethyl-phenyl)-ethyl]-4-hydroxy - coumarin (M.P. 178 to 179°); with 3,4-dimethyl-phenyl-ethyl - carbinol the 3-[α-(3',4'-dimethyl-phenyl)-n-propyl]-4-hydroxy-coumarin (M.P. 184 to 185°); with p-fluor-phenyl-methyl-carbinol the 3-[α-(p-fluor-phenyl)-ethyl]-4-hydroxy-coumarin (M.P. 182 to 184°); with p-fluor-phenyl-ethyl-carbinol the 3-[α-(p-fluor-phenyl)-n-propyl]-4-hydroxy-coumarin (M.P. 175 to 177°); with p-diphenylyl-methyl-carbinol the 3-[α - (p-diphenylyl)-ethyl] - 4 - hydroxy-coumarin (M.P. 192 to 193°); from 1,4-bis-(α-oxy-ethyl)-benzene (obtained by catalytical hydration of 1,4-diacetyl-benzene) and 4-hydroxy-coumarin there is obtained in analogous condensation a polymer, which possesses also anticoagulability.

Using 7-methyl-4-hydroxy-coumarin as a starting material there are obtained the following compounds: with phenyl-methyl-carbinol the 7-methyl-3-(α-phenyl-ethyl)-4-hydroxy-coumarin (M.P. 185 to 186°); from p-ethyl-phenyl-ethyl-carbinol the 7-methyl-3-[α-(p-ethyl-phenyl)-n-propyl]-4-hydroxy-coumarin (M.P. 169 to 171°); with p-anisyl - ethyl - carbinol the 7-methyl-3-[α-(p-anisyl)-n-propyl] - 4 - hydroxy-coumarin; with 3,4-tetra-methylene-phenyl - methyl - carbinol the 3-[α-(3',4'-tetra-methylene-phenyl)-ethyl]-4-hydroxy-coumarin (M.P. 137 to 138° C.); with 3,4-tetra-methylene-phenyl-ethyl-carbinol the 3-[α-(3',4'-tetra-methylene-phenyl)-propyl]-4-hydroxy-coumarin (M.P. 173 to 175°); with 3,4-trimethylene-phenyl-methyl-carbinol the 3 - [α - (3',4' - trimethylene-phenyl)-ethyl]-4-hydroxy-coumarin (M.P. 176°); with 3,4-trimethylene-phenyl-ethyl-carbinol the 3-[α-(3',4'-trimethylene-phenyl)-propyl]-4-hydroxy-coumarin (M.P. 160 to 162°); with 2,5-dimethyl-phenyl-methyl-carbinol the 3-[α-(2',5'-dimethyl-phenyl)-ethyl] - 4 - hydroxy-coumarin (M.P. 217.5 to 218°); with 2,5-dimethyl-phenyl-ethyl-carbinol the 3 - [α - (2',5'-dimethyl-phenyl)-propyl]-4-hydroxy-coumarin (M.P. 215 to 217°); with 2,4-dimethyl-phenyl - ethyl - carbinol the 3-[α-(2',4'-dimethyl-phenyl)-propyl]-4-hydroxy-coumarin (M.P. 156 to 158°); with 4-phenoxy-phenyl-methyl-carbinol the 3-[α-(4-phenoxy-phenyl)-ethyl]-4-hydroxy-coumarin (M.P. 137 to 138°); with 1,3-diphenyl-propanol the 3-(α,γ-diphenyl-propyl)-4-hydroxy-coumarin (M.P. 163 to 165°); with 3-acenaphthyl-methyl-carbinol the 3-[α-(3'acenaphthyl)-ethyl]-4-hydroxy-coumarin (M.P. 203 to 205°); with p-propyl-phenyl-methyl-carbinol the 3-[α-(p-propyl-phenyl)-ethyl]-4-hydroxy-coumarin (M.P. 136 to 137°); with p-propyl-phenyl-ethyl-carbinol the 3-[α-(p-propyl-phenyl)-propyl]-4-hydroxy-coumarin (M.P. 105 to 106°); with p-cyclohexy - phenyl - methyl-carbinol the 3 - [α-(p-cyclohexyl-phenyl)-ethyl]-4-hydroxy-coumarin (M.P. 170 to 172°); with p-cyclohexyl-phenyl-ethyl-carbinol the 3-[α-(p-cyclohexyl-phenyl)-propyl]-4-hydroxy-coumarin (M.P. 178 to 179°).

*Example 10*

8 parts by weight 4-hydroxy-coumarin are dissolved in 25 parts by volume glacial acetic acid and mixed with 0.1 part by volume 30% sulphuric acid at a temperature of about 100° C. Then there are added 11 parts by weight 3,4-methylene dioxy-phenyl-ethyl-carbinol at a temperature of 60 to 70° C. After stirring for another hour and keeping the mixture at the same temperature it is poured into water and the reaction product is taken up in ether. The etherical solution is extracted with 1% soda lye. The aqueous extract is acidified with diluted hydrochloric acid. The reaction product is filtered off and dried. Yield: 12 parts by weight 3-[α-(3',4'-methylene-dioxy-phenyl)-propyl] - 4 - hydroxy-coumarin (M.P. 163 to 164° from diluted alcohol).

*Example 11*

8 parts by weight 4-hydroxy-coumarin and 10 parts by weight 4-chloro-phenyl-methyl-carbinol are dissolved in 40 parts by volume glacial acetic acid at a temperature of about 100° C. There are added 3 parts by volume concentrated sulphuric acid. The mixture is heated to reflux for further 1½ hours and worked up as described in the foregoing examples. The 3-(α-4'-chloro-phenyl-ethyl)-hydroxy-coumarin obtained in recrystallised from diluted alcohol (M.P. 183 to 185°).

*Example 12*

8 parts by weight 4-hydroxy-coumarin and 10 parts by weight 4-methoxy - phenyl - ethyl - carbinol are dissolved homogeneously with 2.5 parts by volume glacial acetic acid at a temperature of about 100° C. There is added slowly 1 part by volume 50% sulphuric acid. After stirring the mixture for another hour at a temperature of 100 to 110° it is worked up as described in Example 1. There is obtained 3 - (α-4'-methoxy-phenyl-propyl)-4-hydroxy-coumarin (M.P. 141 to 143° from petrol ether).

*Example 13*

8 parts by weight 4-hydroxy-coumarin and 10 parts by weight 4-chloro - phenyl - methyl - carbinol are dissolved homogeneously with 3 parts by volume glacial acetic acid at a temperature of about 130° C. There are added slowly 0.5 part by weight sulphuric acid (60 Bé.). After stirring the mixture for another hour at a temperature of about 130° C. it is worked up as described in Example 1. There is obtained the 3-(α-4'-chloro-phenyl-ethyl)-4-hydroxy-coumarin. Yield: 10 parts by weight.

*Example 14*

8 parts by weight 4-hydroxy-coumarin and 10 parts by weight phenyl-ethyl-carbinol are dissolved homogeneously at a temperature of 160 to 170° C. There is added slowly 1 part by volume 30% sulphuric acid. After keeping the mixture for 15 minutes at a temperature of about 160° it is worked up as described in Example 1. There is obtained 3-(α-phenyl-propyl) - 4 - hydroxy-coumarin (M.P. 178 to 179°).

Example 15

8 parts by weight 7-methyl-4-hydroxy-coumarin and 9 parts by weight phenyl-ethyl-carbinol are dissolved with 5 parts by volume glacial acetic acid at a temperature of about 100° C. There is added slowly 1 part by volume sulphuric acid (60° Bé.). The mixture is heated for 1 hour at a temperature of about 120° C., poured into water and worked up as described in Example 1. There is obtained 7-methyl-3-(α-phenyl-propyl)-4-hydroxy-coumarin (M.P. 160 to 162° C. from diluted methanol).

Using 8 parts by weight 7-chloro-4-hydroxy-coumarin instead of 7-methyl-4-hydroxy-coumarin there is obtained the 7-chloro-3-(α-phenyl-propyl)-4-hydroxy-coumarin (M.P. 165 to 166° C. from diluted methanol).

Example 16

8 parts by weight 4-hydroxy-coumarin and 10 parts by weight p-tolyl-ethyl-carbinol are dissolved with 5 parts by volume glacial acetic acid at a temperature of about 100° C. There is added slowly 1 part sulphuric acid (60° Bé.). Then the mixture is heated for another hour at a temperature of about 120° C.; it is poured into water and worked up as usual. There is obtained from diluted methanol the 3-(α-p-tolyl-propyl)-4-hydroxy-coumarin (M.P. 131 to 132°).

Using 8 parts by weight 7-methyl-4-hydroxy-coumarin instead of 4-hydroxy-coumarin there is obtained the 7-methyl - 3 - (α-p-tolyl-propyl)-4-hydroxy-coumarin (M.P. 151 to 153°).

Using p-chloro-phenyl-ethyl-carbinol instead of p-tolyl-ethyl-carbinol there is obtained the 3-(α-p-chloro-phenyl-propyl)-4-hydroxy-coumarin (M.P. 192 to 192.5°).

Example 17

8 parts by weight 4-hydroxy-coumarin and 11 parts by weight phenyl-butyl-carbinol are dissolved in 7 parts by volume glacial acetic acid at a temperature of about 100° C. There is added slowly 1 part by volume sulphuric acid (60° Bé.). The mixture is kept for another hour at a temperature of 110 to 120° C. Then the reaction product is poured into water and worked up in accordance with the foregoing examples. From diluted alcohol there crystallizes the 3-(α-phenyl-n-pentyl)-4-hydroxy-coumarin (M.P. 183 to 184°).

In analogous manner there is obtained from 4-hydroxy-coumarin with phenyl-cyclohexyl-carbinol the 3-(phenyl-cyclohexyl-methyl)-4-hydroxy-coumarin (M.P. 207 to 208° from diluted alcohol); with phenyl-(β-isopropyl)-ethyl - carbinol the 3 - (α-phenyl-δ-methyl-pentyl)-4-hydroxy-coumarin (M.P. 205 to 207° from ether-petrol-ether); with phenyl-isopropyl-carbinol the 3-(α-phenyl-β-methyl-propyl)-4-hydroxy-coumarin (M.P. 204 to 205° C. from diluted alcohol), and with phenyl-isobutyl-carbinol the 3 - (α - phenyl-γ-methyl-butyl)-4-hydroxy-coumarin (M.P. 207 to 209° C. from ether-petrol-ether).

We claim:
1. A process for the production of a derivative of 4-hydroxy-coumarin of the general formula

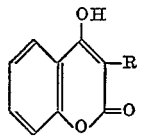

in which R stands for a member selected from the group consisting of

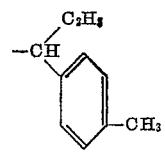

and

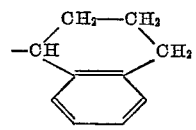

which comprises reacting at a temperature from about 50° C. to about 250° C. 4-hydroxy-coumarin with a compound of the formula HOR in which R has the same significance as shown above.

2. A process according to claim 1, wherein the reaction is carried out in the presence of an inert organic solvent.

3. A 4-hydroxy-coumarin of the formula

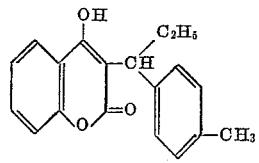

4. A 4-hydroxy-coumarin of the formula

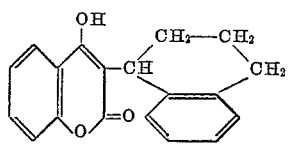

5. A compound of the formula

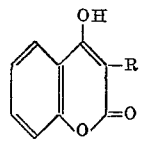

in which R stands for a member selected from the group consisting of

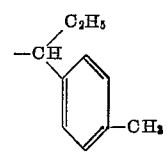

and

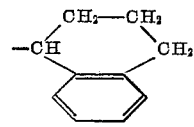

References Cited in the file of this patent

UNITED STATES PATENTS

| | | |
|---|---|---|
| 2,471,047 | Stahman et al. | May 24, 1949 |
| 2,601,204 | Campbell et al. | June 17, 1952 |
| 2,648,682 | Stoll et al | Aug. 11, 1953 |
| 2,723,276 | Grussner et al | Nov. 8, 1955 |
| 2,789,986 | Prochazka | Apr. 23, 1957 |
| 2,811,476 | Manzelli et al. | Oct. 29, 1957 |
| 2,824,826 | Katsaros | Feb. 25, 1958 |

OTHER REFERENCES

Chem. Abst., vol. 41, p. 6232 (1947).